Aug. 26, 1941.   W. C. HILL   2,253,784
APPARATUS FOR TREATING FRUITS AND VEGETABLES
Original Filed Dec. 24, 1934    2 Sheets-Sheet 1

INVENTOR
WALLACE CURTIS HILL
BY
Harold W. Mattingly
ATTORNEY.

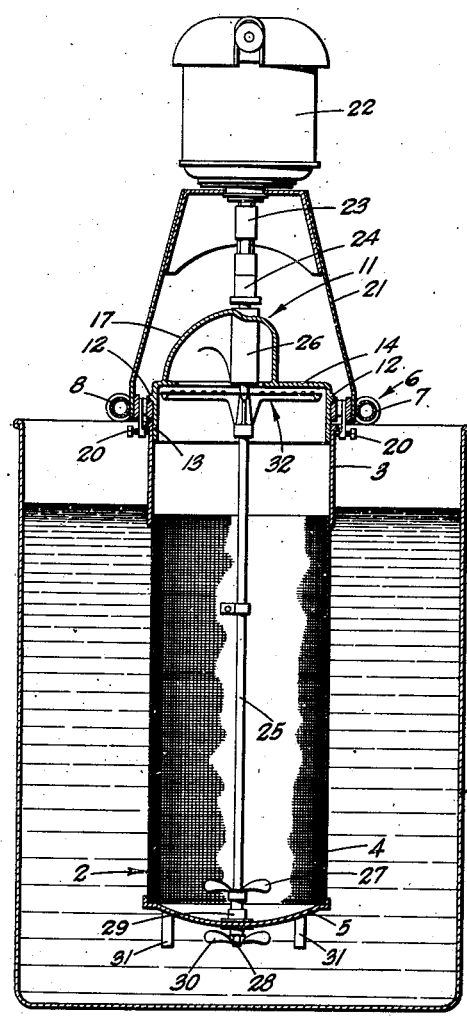
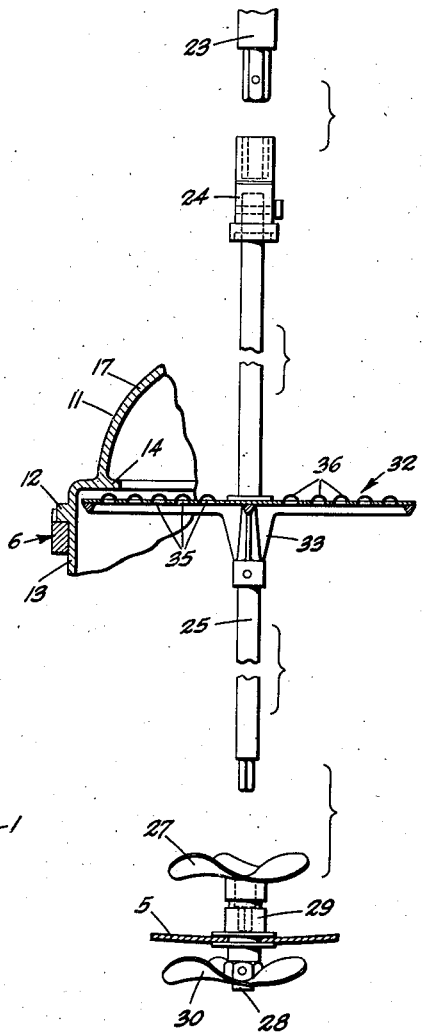

Patented Aug. 26, 1941

2,253,784

UNITED STATES PATENT OFFICE 2,253,784

APPARATUS FOR TREATING FRUITS AND VEGETABLES

Wallace Curtis Hill, Pomona, Calif.

Original application December 24, 1934, Serial No. 759,009. Divided and this application April 19, 1937, Serial No. 137,812

1 Claim. (Cl. 146—3)

This invention relates to a machine and apparatus for cutting and treating fruits, vegetables and the like for the production of base products therefrom, such as beverage bases and fruit juice products capable of being used in the manufacture of beverages, ices, confections and other food products. The invention is particularly directed toward a machine in which substantially all of the juices and natural oils of the fruit or other commodity may be recovered and rendered available for use in substantially the same proportions as they exist in the whole fruit.

This application is a division of my copending application Serial No. 759,009, filed December 24, 1934, which matured to Patent No. 2,086,911 granted July 13, 1937, in which is described and claimed a product and method of producing the same employing the apparatus disclosed herein.

In the production of fruit or vegetable juices it has been customary to grind the fruit, for example, with auger grinders which crush the fruit through knives or cutters by compressive forces, or in the production of citrus juices or citrus juice beverages the fruit may be cut in half, the meat reamed out to disrupt the internal cell structure and thus obtain the juice while the oils from the peels was extracted separately by the use of solvents and the like.

By the employment of the halving and reaming method and the subsequent extraction of oils from the peel, a large proportion of the volatile oils and water-soluble constituents (possibly including constituents containing vitamin C) was lost, and the more delicate and volatile fractions could not be successfully collected. When attempts were made to add the extracted oil in small proportions to the previously and separately extracted juice, it was found substantially impossible to duplicate the flavor of fresh citrus juice nor to disperse the oil in sufficiently fine form within the juice.

Processes of the character described hereinabove, furthermore, result in products which have a relatively low vitamin C content. This was probably due to the extensive handling and manipulation to which the juices and fruit were exposed.

By the employment of the compressive or auger grinding devices, the entire fruit or other article was crushed and the juices and oils were squeezed therefrom. Such processes, however, resulted in the loss of considerable quantity of the oils and juices due to the fact that the fibrous portions of the fruit were released from compression in the presence of the extracted juices and oils and immediately reabsorbed a relatively large quantity thereof. Furthermore, the crushing or squeezing of the fruit or other article extracts the oils in relatively large droplets which collect and separate from the juices extracted.

It is therefore an object of this invention to provide a machine and apparatus for the extraction of juices, oils and other constituents from fruits or vegetables, in which substantially no compressive forces are exerted upon the fruit.

Another object of my invention is to provide a machine and apparatus of the character described wherein the fruit or the like is presented to a rapidly moving knife structure which will cut minute slices from the fruit at such speeds that the peels and juice sacs of the fruit or the like will be disrupted substantially simultaneously, the constituents so liberated being in substantially the same proportion as these constituents exist in the whole or uncut fruit.

Another object of my invention is to provide a machine of the character set forth wherein the cutting or slicing of the fruit or the like occurs immediately above a liquid medium and will be transferred immediately to said medium whereby the liberated juices and oils will immediately become dispersed in said medium.

Another object of my invention is to provide an apparatus of the character set forth wherein a tank containing the medium is disposed immediately below the knife and into which the sliced fruit or the like will be immediately deposited by the action of the knife.

Another object of my invention is to provide a machine of the character set forth wherein a screen is employed immediately below the knife for collecting the sliced fruit or the like and separating any large pieces from the medium contained in the tank.

Another object of my invention is to provide a machine of the character set forth in the preceding paragraph wherein the motive means for operating the knife also acts to circulate the medium through the screen to assist in the intimate association of the medium with the cut fruit.

Other objects of my invention will be apparent from a study of the following specifications, read in connection with the accompanying drawings, wherein—

Fig. 2 is a vertical section taken along line II—II of Fig. 1;

Fig. 4 is an enlarged exploded view of the disc knife, power shaft, motor shaft and medium circulating impellers.

Figures 1, 3:
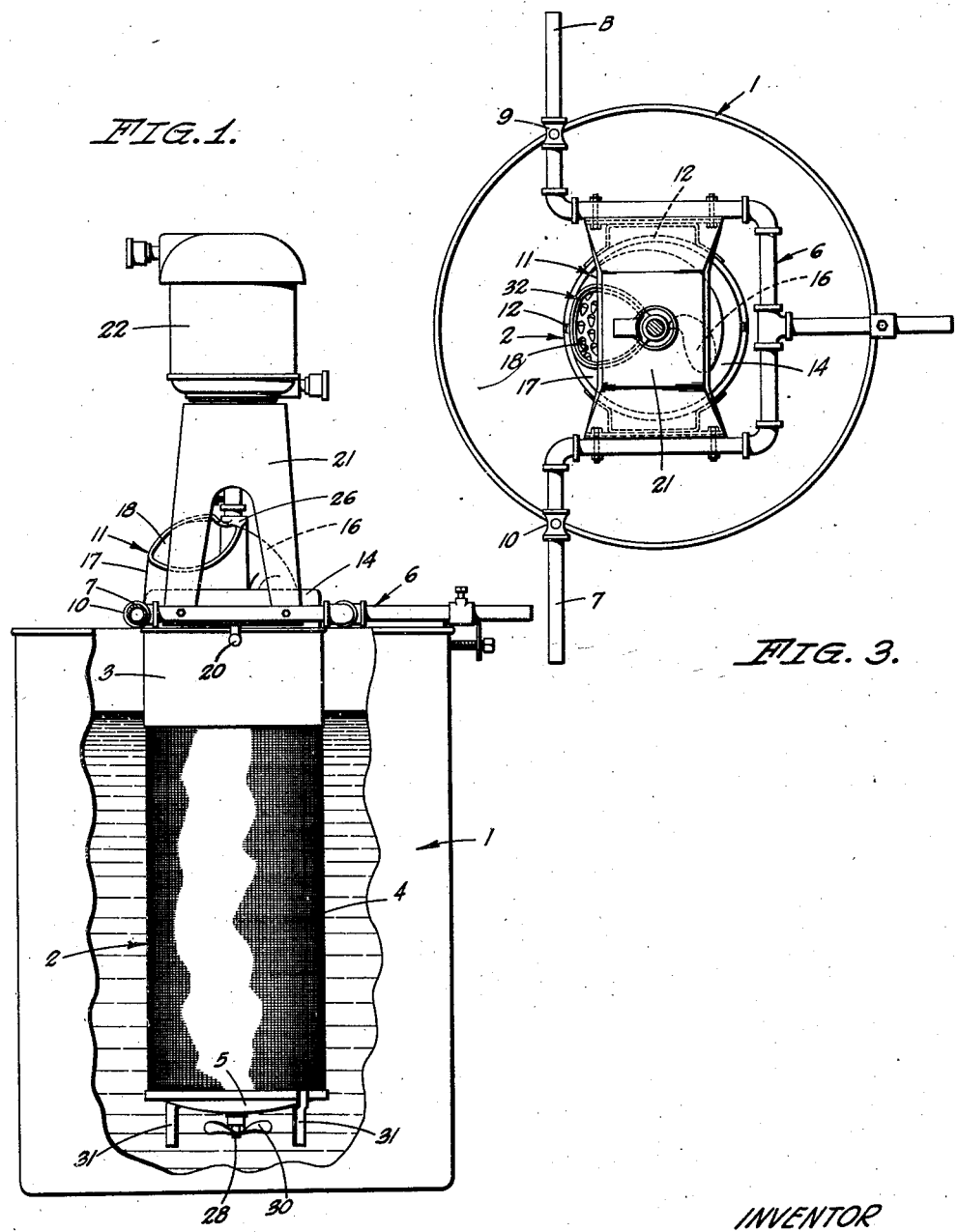
Fig. 1 is a side elevation, partly broken away, of one form of apparatus for carrying out my invention.
Fig. 3 is a plan view of the apparatus shown in Figs. 1 and 2.

While the embodiment of the invention herein described is particularly adapted for the treatment of citrus fruits, such as oranges, lemons and the like, and for purposes of clarity and ready understanding a description of the use of the invention in the production of a citrus fruit base is employed as an example of the operation of the apparatus, it will be understood by those skilled in the art that the apparatus is equally adapted for the shredding and extraction of juices, oils and other constituents from other fruits and vegetables.

In general, the method of this invention comprises bringing whole citrus fruit in contact with a rapidly moving shredding surface whereby the fruit is shredded in a plurality of substantially parallel planes extending transversely through the fruit. In this manner, a portion of the oil cells carried by the peel are disrupted and shredded at substantially the same time that a portion of the juice sacs of the fruit are disrupted. The simultaneous liberation of oil and juice is conducted in such manner that the oils are absorbed by and dispersed in the juice in the form of a very finely divided stable suspension. It has been discovered that the fibrous membrane and albedo, although shredded simultaneously, are not reduced to as fine state of division as the outer peel or the inner juice sacs. For this reason it is possible to separate the albedo and coarser fibrous membranes with relative ease from the finely divided solids, juice and oils dispersed therein.

In order that the resulting product be substantially stable, that is, not exhibit a separation between the oil and aqueous juice, it has been found necessary to perform the shredding operation with great rapidity. The shredding surface with which the fruit are brought into contact, for example, should move at a linear speed of not less than about 1500 feet per minute and preferably at a speed of from about 2000 to 3000 feet per minute. When the process is carried out at the preferred speeds, the oils are found to be dispersed in the form of droplets having an average diameter of about 0.0005 inch or less. Stability of the resulting product is not obtained when these droplets are larger in diameter than about 0.001 inch. When speeds lower than 1500 feet per minute are used, there is a tendency for the oil to assume the form of large droplets which separate from the product, eventually forming a film of oil on the surface. Oxidation sets in and terebinthinate odors and flavors are developed whereas these disadvantages are not encountered when the preferred and higher shredding speeds are used. Although all citrus fruits can be effectively shredded within the range of speeds indicated hereinabove, the precise speed adapted to produce such effective dispersion of the natural oils will depend somewhat upon the type of citrus fruit being treated and the size of the oil cells or oil sacs found in the peel of such fruit.

The appended drawings illustrate one form of apparatus whereby the method of this invention may be effectively carried out. As there shown, the apparatus may comprise a suitable tank 1, in which there is positioned an extraction cylinder, generally indicated at 2, said cylinder comprising an upper imperforated portion 3, a lower perforated or screen portion 4 and a base 5. The extraction cylinder 2 may be suspended from a frame 6 provided with outwardly extending supporting arms 7 and 8 which may rest on the upper edges of the tank 1. Collars 9 and 10 may be carried by the supporting arms for the purpose of being interposed between said arms and the edges of the tank.

The supporting frame 6 holds and supports a head 11 provided with outwardly extending lugs 12 adapted to cooperate with lug-receiving grooves formed in the edges of the supporting frame 6. The head is provided with a substantially cylindrical, downwardly extending body portion indicated at 13 and a transverse substantially horizontal portion 14. This portion 14 is provided with a spirally arranged opening of gradually decreasing width, indicated at 16, the transverse member 14 being built up from near the edges of said spiral opening, as indicated at 17, so as to form a spirally arranged, downwardly directed conduit of gradually decreasing area in vertical section. A feeding aperture 18 is formed in the upper end of the spiral feeding conduit thus formed.

The upper portion of the extraction cylinder 2 may be provided with an outwardly extending flange and be of such diameter as to slip over the body portion 13 of the head 11. Suitable clamps 20 carried by the supporting frame 6 permit the extraction cylinder 2 to be removably attached to the head and frame, the clamps 20 cooperating with the outwardly extending flange of the upper portion 3 of the extraction cylinder 2.

The supporting frame 6 may be provided with a suitable frame 21 adapted to support a motor 22 in position concentrically with respect to the extraction cylinder 2. The drive shaft 23 of the motor 22 may be removably coupled as by means of a slidably adjustable coupling 24 to a drive shaft 25 extending through a bearing sleeve 26 carried by the head 11 and into the extraction tank 2. The lower end of the shaft 25 may carry an agitator 27 and be removably keyed to a short length of shafting 28 journaled in the base 5. The end of the shaft 25 may be squared for introduction into a square socket portion carried in the coupling 29 forming a part of the stub shaft 28. The lower end of the stub shaft 28 below the base 5 may be provided with agitator blades 30. The base 5 may be provided with downwardly extending legs 31 adapted to protect the propeller blades 30 in the event the extraction cylinder is dropped.

Immediately below the plane of the transverse partition 14 of the head 11, the shaft 25 is provided with a shredder disc, generally indicated at 32, carried by a hub 33 attached to the shaft 25. The shredder disc 32 may in general be made of relatively thin material but in such case it should be provided with radially directed reinforcing ribs and a reinforced edge. The disc itself is suitably perforated or punched, as indicated at 35. A portion of the disc adjacent each of the perforations is raised above the plane of the disc, as indicated at 36, the edge of said raised portion being sharpened to a razor edge so as to provide shredding knives lying in a plane of about $\frac{1}{16}$ inch above the upper surface of the disc 32. The method of construction described hereinabove provides a through opening in the disc immediately in advance of the sharp edges of the knives, thereby preventing choking of the disc with the shredded portions of the fruit. It is also to be noted that sharp edges of the shredder knives are pointed in the direction of rotation of said disc and toward the narrow portion of the spiral hood or feeder 16.

In operation, the tank 1 is partially filled with milk, sirup, alcoholic solution or other medium in which it is desired to incorporate the juice and oils of citrus fruits. Preferably the level of the liquid in the tank 1 is sufficiently high to completely submerge the perforated screen cylinder 4. Citrus fruits are then introduced through the opening 18 in the head 17 while the shredding disc and agitators 27 and 30 are rotated at the desired speed. As stated hereinbefore, the linear speed of the shredders should be between 2000 and 3000 feet per minute. The citrus fruits are pressed against the shredder by the downwardly directed spiral throat 16, each fruit being shredded by a series of transverse cuts, the spherical fruit being thus reduced to semispherical, then to a segment of a sphere, and finally completely shredded. The oils and juices thus liberated immediately fall into the liquid within the tank 1. The agitators 27 and 30 maintain circulation of the liquid through the perforated cylinder 4, thereby causing the oils and juices to pass into the tank 1 while retaining the fibrous matter within the screen cylinder 4. It will be observed that the shredded fibrous and pulpy matter is not maintained in contact with juices but instead is immediately brought into contact with the fluid in the tank 1. A form of extraction takes place in the screen cylinder 4, extractable constituents being distributed and dissolved in the liquid whereas the fibrous solids are retained within the cylinder. The formation of an impenetrable layer of fibrous material on the inner screen surfaces is prevented by reason of the vigorous agitation afforded by the propellers 27. The screen 4 is preferably of a relatively fine mesh, say 10 to 15 mesh. These sizes have been found sufficient to permit certain of the very fine juice sacs to pass into the liquid in tank 1 and to also permit finely shredded and colored portions of the peel to pass therethrough while retaining in the screen cylinder 4 long, fibrous and pulpy portions originating in the membranes and albedo.

An orange beverage base prepared on a small unit answering the description given hereinabove was made using 100 pounds of water, 50 pounds of sugar and 2½ pounds of citric acid for the liquid in tank 1; 56 pounds of oranges were then grated and dispersed within the sirup. The weight of the pulp and entrained liquid remaining in the screen cylinder 4 was about 46 pounds, the balance consisting of sirup and orange products. It was found that 1 cubic centimeter of this sirup-orange juice product had a content of 0.12 mgm. ascorbic acid, several hours after its preparation. In a check test made upon the juice of oranges from the same lot of fruit, the juice being extracted by ordinary hand methods immediately prior to the ascorbic acid determination showed 0.33 milligram of ascorbic acid per cc. As the product prepared as described hereinabove consisted of citrus juice diluted with sirup, it is evident that products made in accordance with this invention have practically the same ascorbic acid content as perfectly fresh orange juice. These determinations were made using the indophenol reduction method, which correctly indicates the vitamin C content of food stuffs. The vitamin C contents of products made in accordance with this invention are much higher than those of any canned or preserved dairy or fruit juice known to applicant.

As stated hereinabove, the citrus juices and dispersions may be made in sirups, milk, alcoholic solutions, etc., for use as beverages, food bases, sherbets, ices and the like. It appears that the vitamin C content of products produced in this manner is maintained extremely high over protracted periods of time whereas ordinary citrus juices rapidly degrade in vitamin C content upon standing.

It will therefore be observed that I have provided apparatus which may be employed for the cutting, slicing or shredding of fruits, vegetables and the like, in which minute slices of the fruit will be made by the rapidly rotating disc cutter, and in which the fruit so cut will be immediately directed by the knife downwardly into the medium which is to be employed for suspending and absorbing the liberated products.

While I have shown and described the preferred embodiment of my invention, I do not desire to be limited to any of the details hereinbefore described or illustrated except as described in the appended claim.

I claim:

In a machine for treating fruit and the like, a shredding disc having cutters thereon for cutting thin slices from fruit resting against the surface of said shredder, a shaft mounting said disc for rotation about a vertical axis, a receptacle disposed below said disc to receive the cut fruit and the fluids liberated therefrom by said disc, said receptacle having a bottom and perforated side walls, a tank disposed around said receptacle for holding a supply of liquid medium to absorb the fluids released from said cut fruit, a power shaft for rotating said disc, said shaft extending through the bottom of said receptacle, and impellers on said shaft above and below said bottom for agitating the liquid medium in said tank.

WALLACE CURTIS HILL.